(12) United States Patent
Badino (10) Patent No.: US 11,535,098 B2
(45) Date of Patent: Dec. 27, 2022

(54) WHEEL UNIT WITH DISENGAGEABLE DRIVE FOR AN ELECTRIC VEHICLE, HUB UNIT FOR THIS WHEEL UNIT, AND MOUNTING METHOD

(71) Applicant: FCA Italy S.p.A., Turin (IT)

(72) Inventor: Renato Badino, Turin (IT)

(73) Assignee: FCA Italy S.p.A., Turin (IT)

(*) Notice: Subject to any disclaimer, the term of this patent is extended or adjusted under 35 U.S.C. 154(b) by 0 days.

(21) Appl. No.: 17/713,322

(22) Filed: Apr. 5, 2022

(65) Prior Publication Data

US 2022/0324320 A1    Oct. 13, 2022

(30) Foreign Application Priority Data

Apr. 7, 2021 (IT) .................. 102021000008579

(51) Int. Cl.
  *B60K 17/02* (2006.01)
  *F16D 48/06* (2006.01)
  *F16D 11/00* (2006.01)

(52) U.S. Cl.
  CPC .............. *B60K 17/02* (2013.01); *F16D 48/06* (2013.01); *F16D 2011/002* (2013.01)

(58) Field of Classification Search
  CPC .... B60K 17/02; F16D 48/06; F16D 2011/002
  USPC ........................................................ 192/69.4
  See application file for complete search history.

(56) References Cited

U.S. PATENT DOCUMENTS

| | | | |
|---|---|---|---|
| 6,170,628 B1 | 1/2001 | Bigley | |
| 8,047,724 B2 | 11/2011 | Kamikawa et al. | |
| 2016/0069397 A1* | 3/2016 | Reiner | B60K 17/3515 |
| | | | 192/69.4 |

FOREIGN PATENT DOCUMENTS

| | | |
|---|---|---|
| JP | 2012218490 A | 11/2012 |
| WO | 2006035836 A1 | 4/2006 |

OTHER PUBLICATIONS

Italian Search Report dated Nov. 2, 2021. 2 pages.

* cited by examiner

*Primary Examiner* — Colby M Hansen
(74) *Attorney, Agent, or Firm* — RMCK Law Group PLC (57) ABSTRACT

A wheel unit for an electric vehicle with a disengageable drive includes a wheel support, a wheel hub rotatably supported by the wheel support, and a wheel pin carried by a member driven by the electric motor and rotatably mounted within the wheel hub, by means of two rolling bearings. A coupling device connects in a releasable way the driven member to the wheel hub. The two rolling bearings that support in rotation the wheel pin have respective outer rings mounted by interference fit within a cylindrical wall of a central opening of the wheel hub, and respective inner rings rigidly connected together by means of a spacer sleeve having a predetermined length. The wheel-hub unit with the two rolling bearings and the spacer sleeve can be assembled before being mounted on the wheel pin.

6 Claims, 8 Drawing Sheets

WHEEL UNIT WITH DISENGAGEABLE DRIVE FOR AN ELECTRIC VEHICLE, HUB UNIT FOR THIS WHEEL UNIT, AND MOUNTING METHOD

CROSS-REFERENCE TO RELATED APPLICATION

This application claims priority to Italian Patent Application No. 102021000008579 filed Apr. 7, 2021. The disclosure of the above application is incorporated herein by reference in its entirety.

FIELD OF THE INVENTION

The present invention regards a wheel unit with disengageable drive for an electric vehicle, of the type comprising:
- a wheel support,
- a wheel hub rotatably supported by the wheel support,
- a wheel pin, rotatably mounted by means of two rolling bearings, which are axially spaced apart from each other, within a cylindrical wall of a central opening of the wheel hub,
- wherein the wheel pin is carried by a rotatable member configured to be driven by an electric motor of the vehicle; and
- a coupling device for releasably connecting the aforesaid driven member to the wheel hub.

PRIOR ART

Solutions of the type referred to above have been already used in high-class battery electric vehicles (BEVs) that are equipped with two electric motors for driving respectively the front wheels and the rear wheels. In electric vehicles of this type, with four-wheel drive, the so-called eAWD (electric All-Wheel Drive), the four-wheel drive is in general overabundant, but is, instead, useful when the aim is to exploit as much as possible the regenerative braking capacity and consequent recharging of the battery or else for driving in limit conditions of adherence of the tyres. To enable engagement and disengagement of a driving axle (normally the front axle), the corresponding wheel units are provided according to the configuration referred to above. Thanks to the coupling device mentioned above, the member driven by the electric motor can be connected in rotation to, or else disconnected from, the wheel pin, according to the requirement of the driver, or else even automatically by the electronic controller of the vehicle, on the basis of the dynamic conditions detected. Passing from the all-wheel drive (AWD) condition to the rear-wheel drive (RWD) condition is moreover advantageous in so far as the passive resistances of the disengaged axle (axle shaft, differential, electric motor) are drastically reduced altogether to the advantage of autonomy of the vehicle battery.

Figure 10:
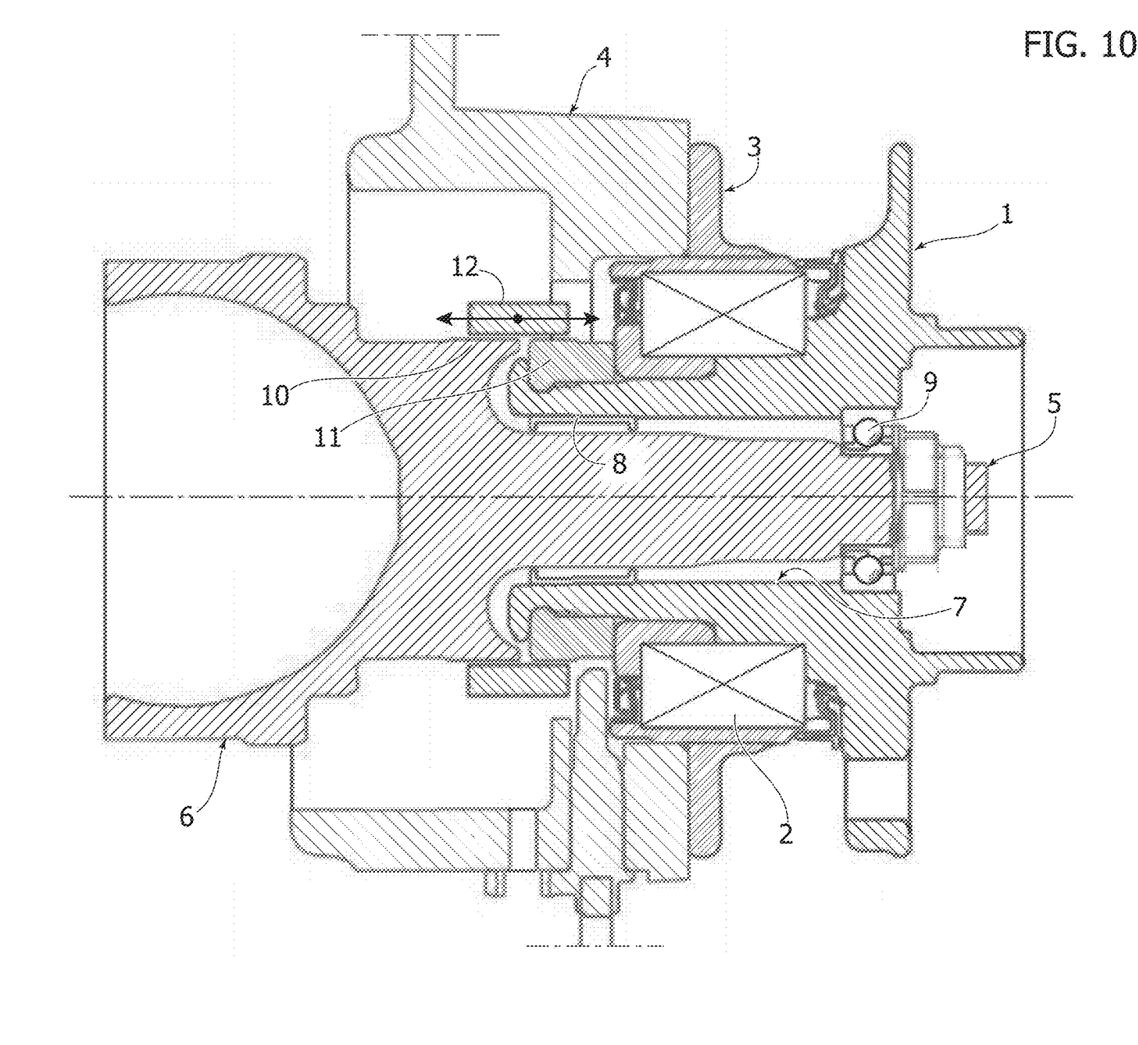
FIG. 10 is a partial schematic cross-sectional view of a wheel unit according to the prior art.

FIG. 10 of the annexed drawings is a schematic cross-sectional view of a wheel unit with disengageable drive of a known type, for an electric vehicle with disengageable front-wheel drive.

In FIG. 10, the reference number 1 designates as a whole the body of a wheel hub that is rotatably mounted via a rolling bearing 2 within a hub-supporting member 3, which is in turn rigidly connected, for example by means of bolts, to a wheel support 4.

The reference number 5 designates a wheel pin that is carried by a driven member 6 (typically a bell-shaped body of a constant-velocity universal joint) that is to be driven in rotation by the electric motor provided for driving the front wheels of the vehicle. Since the wheel unit envisages the possibility of disengaging the connection in rotation between the driven member 6 and the wheel hub 1, the pin 5 is not rigidly connected in rotation to the wheel hub 1, as occurs in conventional solutions with permanent drive, but rather is rotatably mounted within the cylindrical wall 7 of the central opening of the wheel hub 1 by means of two rolling bearings 8, 9, axially spaced apart from each other. In this way, when the wheel hub 1 is not connected in rotation to the pin 5, and the electric driving motor is deactivated, the wheel hub 1 is free to turn around the pin 5, as in the case of any non-driving wheel.

To enable coupling in rotation, the body of the driven member 6 and the body of the wheel hub 1 carry ring gears 10, 11, adjacent to one another, which can both be engaged by the inner toothing of a ring 12, which is carried by the driven member 6 and is axially displaceable via an actuator device (not illustrated in FIG. 10) between an inactive position, in which it engages only the ring gear 10 of the member 6, where the wheel hub 1 is disconnected from the driven member 6, and an active position, in which the inner ring gear of the ring 12 meshes with both of the toothings of the ring gears 10, 11, so that the wheel hub 1 is connected in rotation to the driven member 6 and to the wheel pin 5. In the latter condition, the front electric motor of the vehicle can be activated for driving in rotation the wheel pin 5 and therewith the wheel hub 1. In this condition, the rolling bearings 8, 9 are stationary.

With reference once again to FIG. 10, the known solutions of the type referred to above that have so far been developed envisage the use of a roller bearing 8, without inner ring, with the rollers directly in contact with the surface of the wheel pin 5, and a roller cage mounted within the cylindrical wall 7 of the central opening of the wheel hub 1. The rolling bearing 9 is a ball bearing.

The known solution described above entails a series of drawbacks. In the first place, the use of a roller bearing with rollers directly in contact with the wheel pin 5 renders the ensemble particularly exposed to malfunctioning following upon infiltration of water, mud, and dirt from outside (during installation and removal, in the production stage or during maintenance). Moreover, the roller bearing 8 operates with a relatively wide and non-controllable functional play that is the origin of noise and/or clatter. A further drawback lies in the fact that the two bearings 8, 9 require an operation of adjustment that must be carried out in the production plant and that always entails the risk of it not being in all cases possible to reach the optimal operating condition of the bearings. Yet a further drawback lies in the fact that the ball bearing 9 that is located on the end of the cylindrical wall 7 facing the outside must be equipped with a specific seal against infiltration of water, mud, and dirt, with consequent increase of the passive resistance deriving from the aforesaid seal device. Once again, the entire ensemble described above also envisages application of grease in the production plant, which again leads to complications in the production stage and the risk of faults deriving from the application of an incorrect amount of grease.

In view of the foregoing, there is consequently felt the need for a solution that will overcome the drawbacks referred to above and that in particular will simplify the operations to be carried out in the production plant.

A wheel unit of the type indicated at the beginning of the present description is known from WO 2006/035836 A1.

OBJECT OF THE INVENTION

Consequently, an object of the present invention is to provide a wheel unit of the type described above that will enable deactivation of the drive on the wheel, drastically reducing the passive resistance of the disengaged axle (axle shaft, differential, electric motor) altogether to the advantage of the autonomy of the battery of the electric vehicle, and that at the same time will overcome the drawbacks of the known solutions.

In particular, an object of the invention is to simplify the operations to be carried out in the production plant, envisaging the possibility of pre-assembling (off line) a wheel-hub unit that can then be mounted with a simple operation on the wheel support in the production plant, without requiring complex operations of setting and adjustment.

A further object of the invention is to provide a wheel unit of the type specified above that will always present proper and reliable operation.

A further object of the invention is to provide a wheel unit of the type specified above that will not be exposed to the risk of malfunctioning on account of infiltration of water, mud or dirt.

Finally, yet a further object of the invention is to achieve all the aforesaid aims with a wheel unit that is relatively simple and inexpensive to produce.

SUMMARY OF THE INVENTION

With a view to achieving one or more of the aforesaid objects, the subject of the invention is a wheel unit with disengageable drive for an electric vehicle, comprising:
- a wheel support,
- a wheel hub rotatably supported by the wheel support,
- a wheel pin, rotatably mounted, by means of two rolling bearings axially spaced apart from each other, within a cylindrical wall of a central opening of the wheel hub, wherein the wheel pin is carried by a rotatable member configured to be driven by an electric motor of the vehicle, and
- a coupling device for releasably connecting the aforesaid driven member to the wheel hub, said wheel unit being characterized in that:
- the wheel pin is rotatably mounted within the cylindrical wall of the wheel hub by means of two rolling bearings axially spaced apart from each other, which have respective outer rings mounted by interference fit within said cylindrical cavity, against two respective annular shoulders of said cylindrical cavity and face the two opposite ends of the cylindrical cavity, and
- said rolling bearings have respective inner rings rigidly mounted on said wheel pin and rigidly connected together by means of a spacer sleeve having a length that is predetermined as a function of the axial distance between said annular shoulders,
- the unit consisting of said wheel hub with the rolling bearings and the spacer sleeve, being assemblable before being mounted on said wheel pin.

In a preferred embodiment, the two rolling bearings are two ball bearings. A first ball bearing of said ball bearings, which is further away from a free end of the wheel pin, has its inner ring resting against an annular shoulder of said driven member. A second ball bearing of said ball bearings has its inner ring that is axially fastened by a nut screwed on a threaded portion of said free end of the wheel pin, in such a way as to press the ensemble of the two inner rings of said rolling bearings, with the spacer sleeve interposed therebetween, axially against a shoulder of the driven member.

According to a further characteristic of the invention, the end of the cylindrical wall of the wheel hub that faces outwards is protected and isolated from the outside by a covering element mounted on the wheel hub.

As emerges clearly from the foregoing, in the solution according to the invention, the unit constituted by the wheel hub, with the two aforesaid rolling bearings and with the spacer sleeve rigidly interposed between the inner rings of the two rolling bearings, can be pre-assembled, off the production line, and then mounted in the production plant with a simple operation, which does not require any operation of adjustment. The pre-assembled unit already comprises also the grease for lubricating the bearings, without any need for further operations to be carried out in the production plant.

The outer cover that protects the central opening of the hub prevents intrusion of external agents such as water, mud, and dirt. Preferably, this outer cover is made of metal material in such a way as to exert also an action of protection against accidental impact and bumps.

The aforesaid spacer sleeve is selected with a rigorously predetermined length, which is a function of the axial distance of the aforesaid annular shoulders against which the outer rings of the two rolling bearings are mounted.

The spacer sleeve is rigidly connected, for example by means of a crimping operation, to the inner rings of the two rolling bearings, so as to be integrated in the hub unit. With closing of the nut that is screwed on the threaded end of the wheel pin, the unit is automatically positioned in a proper way, which minimizes the residual rolling torque of each bearing and maximizes the efficiency of the unit in terms of duration and proper and reliable operation, without any risk of noise induced by undesirable play.

The subject of the invention is also the wheel-hub unit taken in itself, which is pre-assembled with the two rolling bearings and the spacer sleeve interposed between the inner rings of the two bearings.

Finally, the invention also regards the method for assembling the hub unit described above, where in a first step the hub unit is assembled, with the two rolling bearings and the aforesaid spacer sleeve, and in a second step the aforesaid hub unit, assembled in the first step, is mounted on a wheel pin, axially fastening the unit in the mounted position by means of a nut screwed on the threaded end of the wheel pin in such a way as to press the ensemble of the two inner rings of the rolling bearings, with the spacer sleeve interposed therebetween, axially against a shoulder of the aforesaid driven member.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF A PREFERRED EMBODIMENT

In FIGS. 1-9, the parts that are in common or correspond to the ones illustrated in FIG. 10, regarding the prior art already described above, are designated by the same reference numbers.

Figure 1:
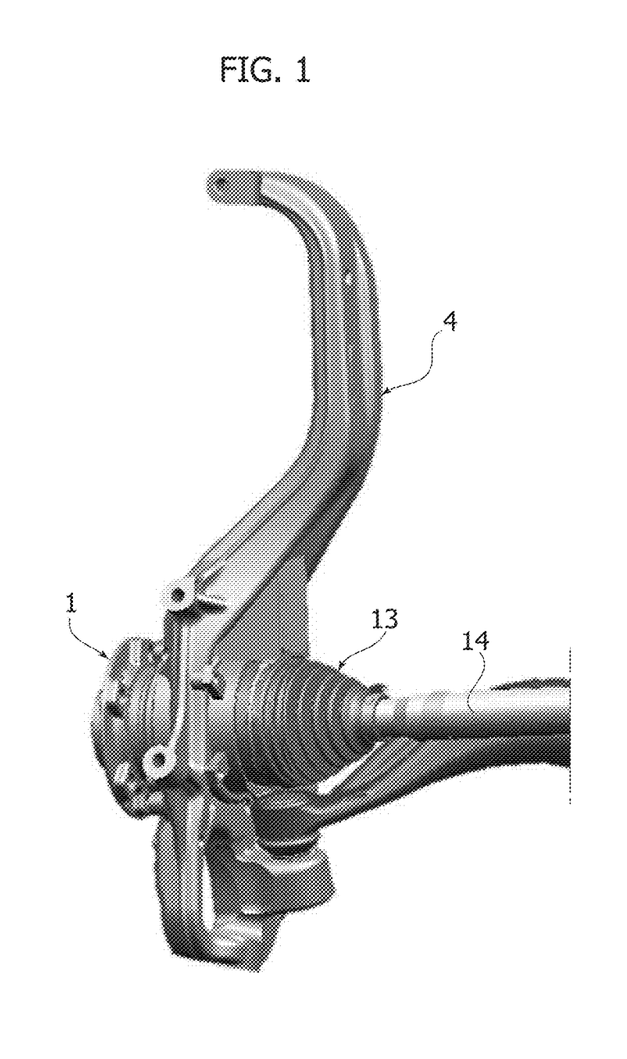
FIG. 1 is a perspective view of a steering front-wheel unit of a conventional type, with a wheel support that rotatably supports a wheel hub that is permanently connected in rotation to an axle shaft driven by an electric motor of the vehicle.

FIG. 1 shows a conventional wheel unit, where a wheel hub 1 is rotatably supported by a wheel support (steering knuckle) 4 and is permanently connected in rotation, via a constant-velocity universal joint 13, with an axle shaft 14 driven by a front electric motor of the vehicle (not illustrated). The example of FIG. 1 refers, in fact, to a front-wheel unit, where the wheel support 4 is supported in an oscillating way about a steering axis of the wheel, by means of members of the vehicle suspension. Both in FIG. 1 and in FIGS. 2-9 that regard the preferred embodiment of the invention, the suspension members to which the wheel support 4 is connected are not illustrated, since they can be provided in any known way and also in so far as, taken in themselves, they do not fall within the scope of the present invention.

As already mentioned above, the wheel unit according to the invention is of the type with disengageable drive for an electric vehicle that is to operate both with a first electric motor that is permanently connected to a wheel axle (typically the rear axle) and with a second electric motor that is connected in a releasable way with the hubs of the front wheels.

Figure 2:
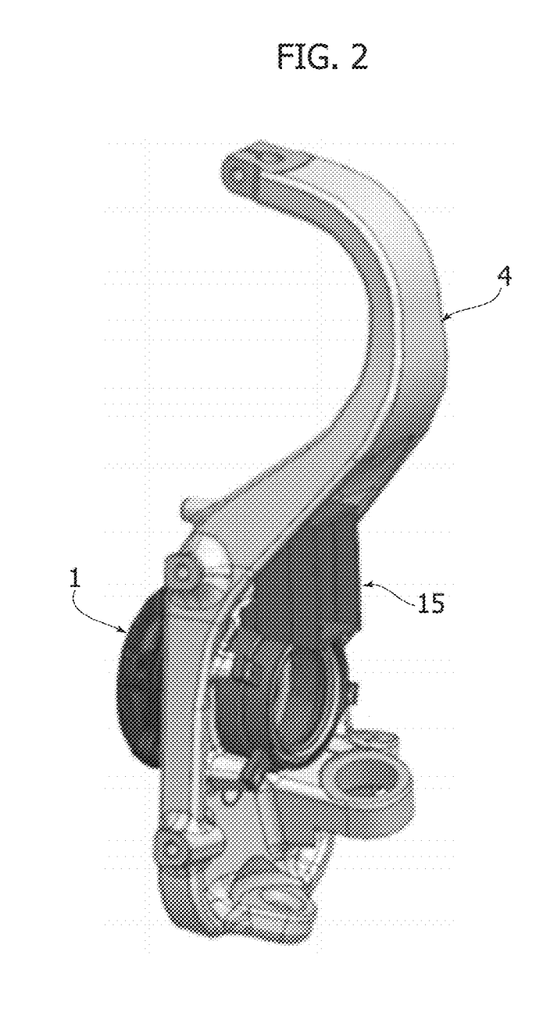
FIG. 2 is a perspective view that shows a wheel support of a steering front wheel to which a preferred embodiment of the invention is applied.

FIG. 2 shows an example of application of the invention to a wheel support 4 of a front steering wheel, with a wheel hub 1 that is rotatably supported by the wheel support 4 and a coupling device 15, described in detail in what follows, which is carried by the wheel support 4 and is provided for connecting selectively in rotation the wheel hub 1 with the driven member of the constant-velocity universal joint 13 (not illustrated in FIG. 2), which in turn is connected to the axle shaft 14 (not illustrated in FIG. 2 either).

Figure 3:
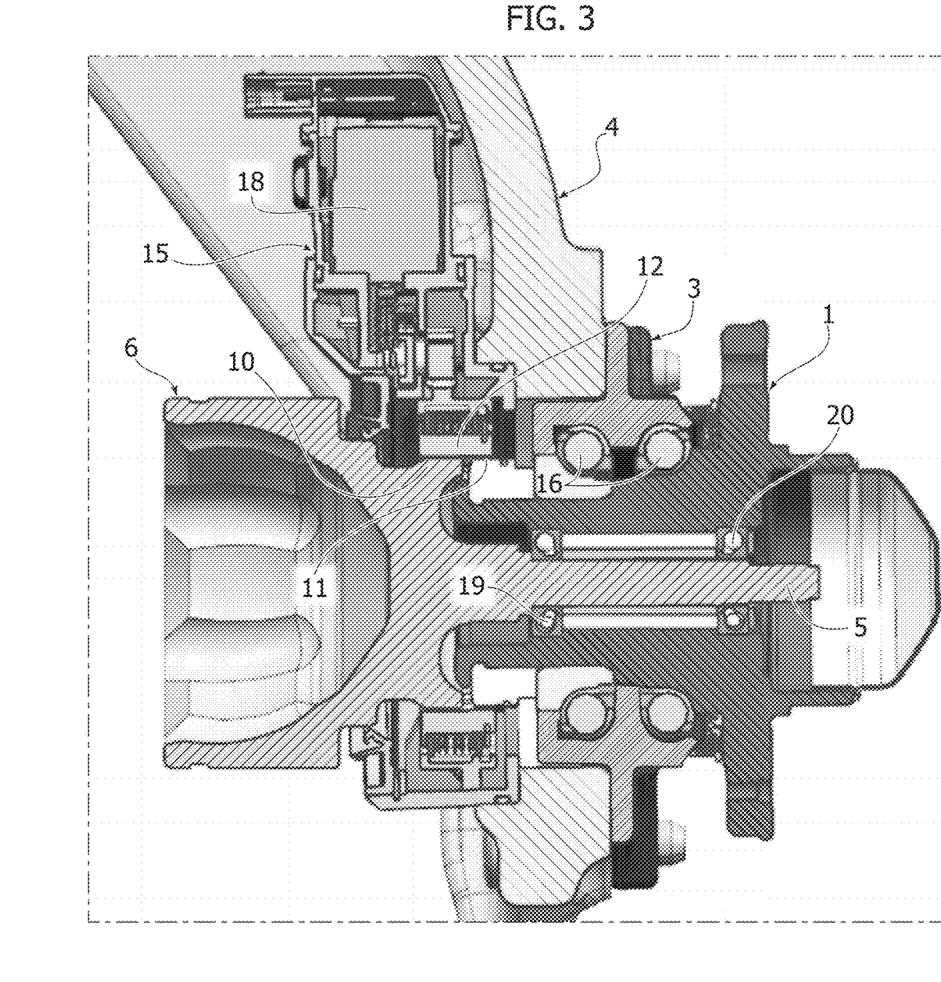
FIGS. 3 and 4 are cross-sectional views of the preferred embodiment of the wheel unit according to the invention, in two different operating conditions.
Figure 4:
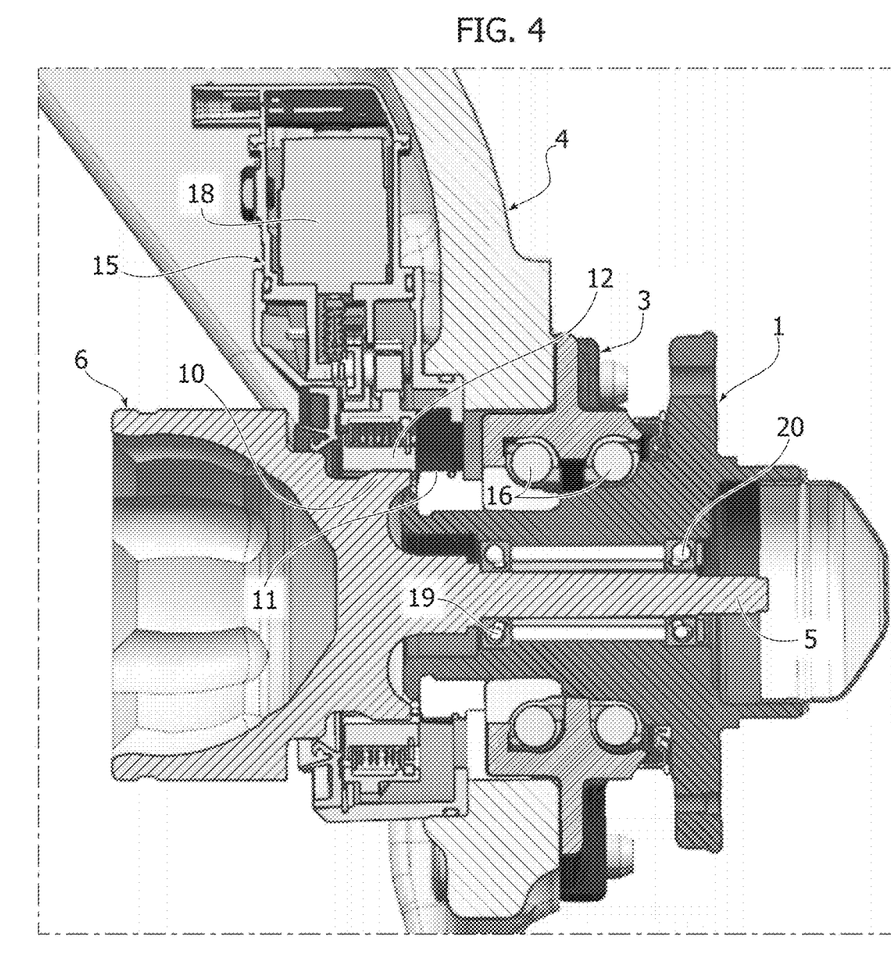
Figure 5:
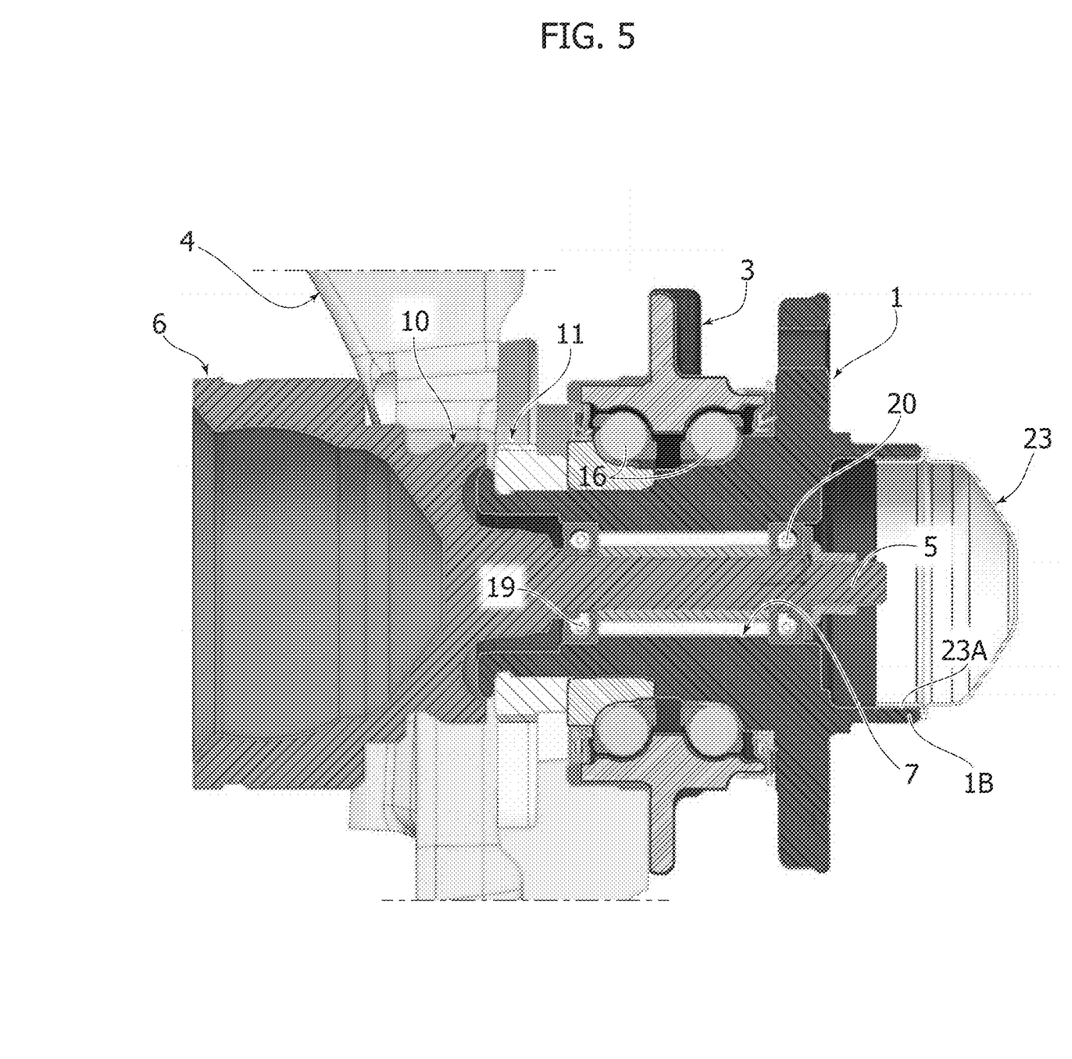
FIG. 5 is a further cross-sectional view at an enlarged scale of the wheel unit of FIGS. 3 and 4.

With reference to FIGS. 3, 4, and 5, in the example of embodiment illustrated here, the wheel hub 1 is rotatably supported, by means of a double ring of balls 16, by a hub-supporting member 3, which is rigidly connected (typically by means of bolts) to the body of the wheel support 4. It should be noted that the specific configuration of the wheel support 4, of the hub-supporting member 3, of the body of the wheel hub 1, as well as of the rolling bearing constituted by the double ring of balls 16, is here illustrated purely by way of example, these components possibly being provided in any other known way.

The driven member 6 of the constant-velocity universal joint has a shaft constituting the wheel pin 5. As in the case of the known solution illustrated in FIG. 10, the body of the driven member 6 and the body of the wheel hub 1 carry ring gears 10, 11 adjacent to one another that can be connected together in rotation, following upon meshing with the inner toothing, by a sliding ring 12 (see FIGS. 3 and 4). FIGS. 3 and 4 also show schematically the actuator device 15, comprising an electric motor 18 that drives, in a way in itself known, by means of a mechanical transmission of any type, axial movement of the ring 12. The details of construction regarding the mechanism controlled by the electric motor 18 are not described or illustrated herein both in so far as they can be obtained in any known way and in so far as, taken in themselves, they do not fall within the scope of the present invention.

FIG. 3 shows the operating condition in which the ring 12 has its inner ring gear that meshes with both of the ring gears 10 and 11, where FIG. 4 shows the operating condition in which the sleeve 12 engages only with the ring gear 10. Consequently, in the condition of FIG. 3, the driven member 6 is connected in rotation to the wheel hub 1, whereas in the condition of FIG. 4 the driven member 6 is uncoupled from the wheel hub 1, which is thus free to rotate on the wheel pin 5.

Figure 6:
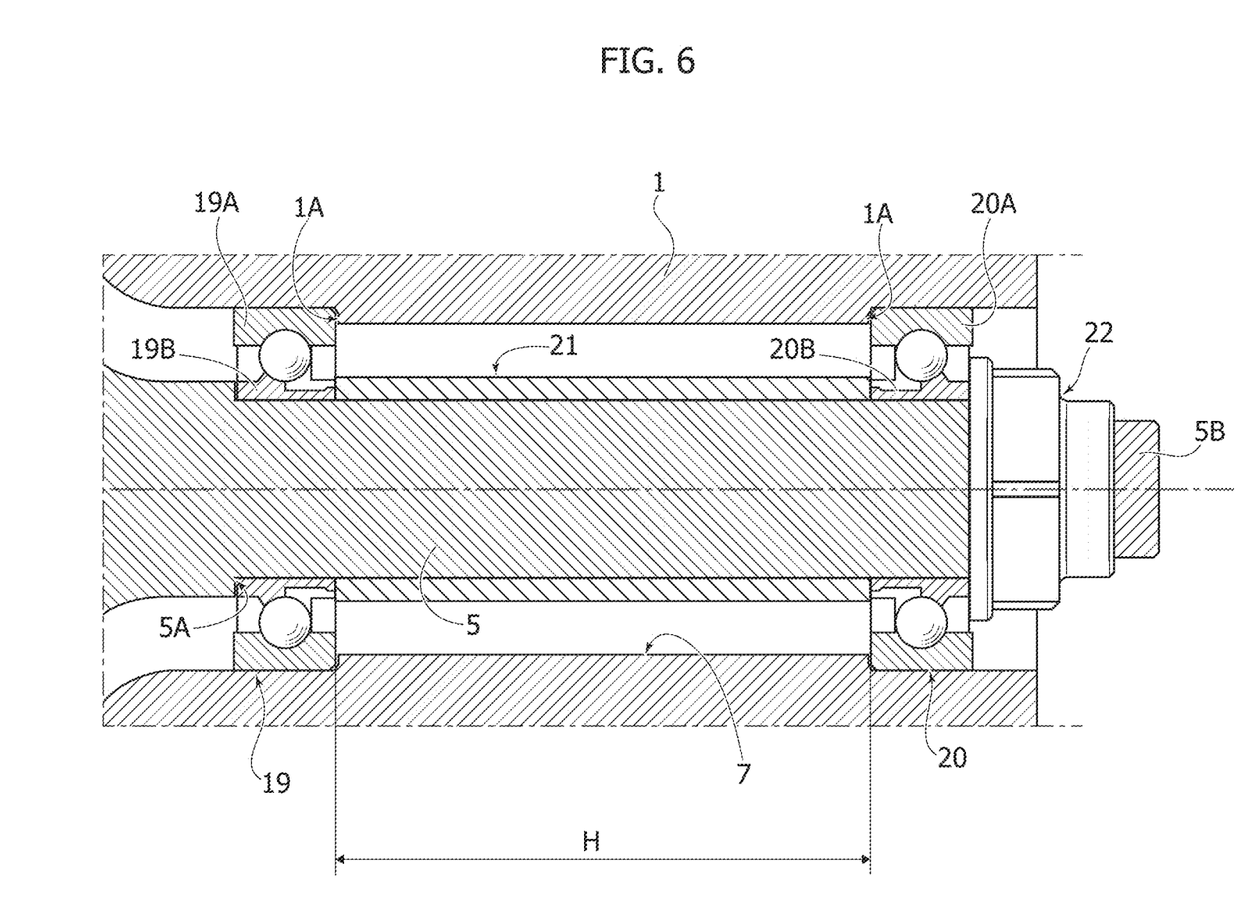
FIG. 6 is a further cross-sectional view at an enlarged scale of a detail of FIG. 5.

With reference in particular to FIGS. 5 and 6, the rotatable support of the wheel hub 1 on the wheel pin 5 is provided by means of two rolling bearings 19, 20 that in the preferred example are both ball bearings, with a single ring of balls. The two ball bearings 19, 20 have outer rings 19A, 20A, respectively, that are mounted bearing upon respective annular shoulders 1A, which face the opposite ends of the cylindrical wall 7 of the central opening of the wheel hub 1 and are defined by widened end portions of the aforesaid wall.

The ball bearings 19, 20 moreover have respective inner rings 19B, 20B that are mounted on the wheel pin 5.

Set between the inner rings 19B, 20B of the two ball bearings 19, 20 is a spacer sleeve 21, preferably made of steel, having a length rigorously predetermined as a function of the axial distance H between the two shoulders 1A, taking into account the configuration of the two bearings 19, 20. In the example, the length of the sleeve 21 is equal to the distance H.

Figure 7:
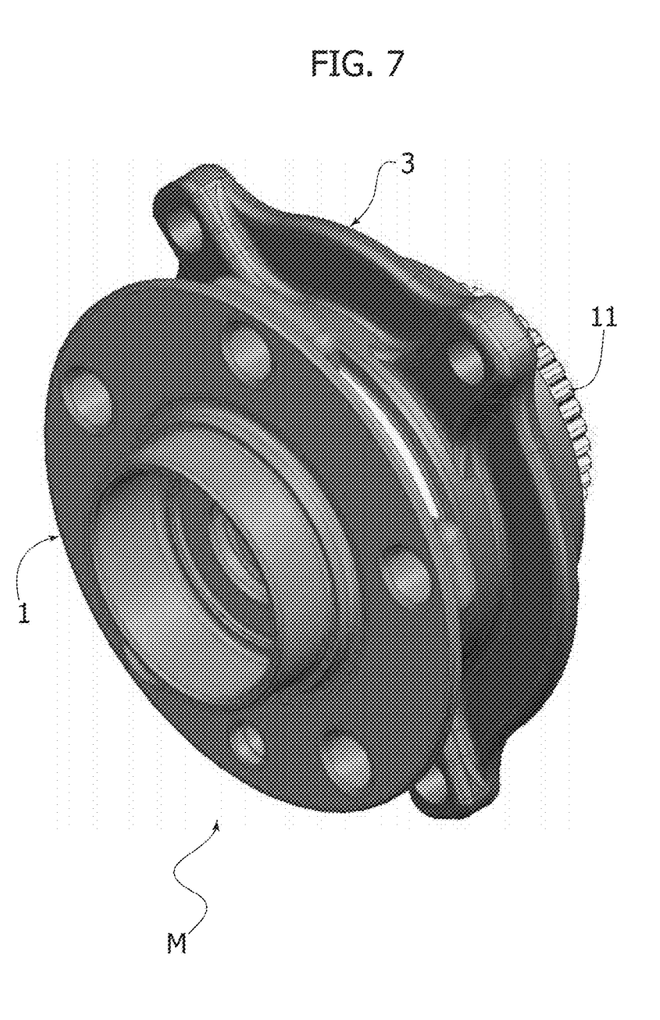
FIGS. 7 and 8 are two perspective views of the hub unit according to the invention.
Figure 8:
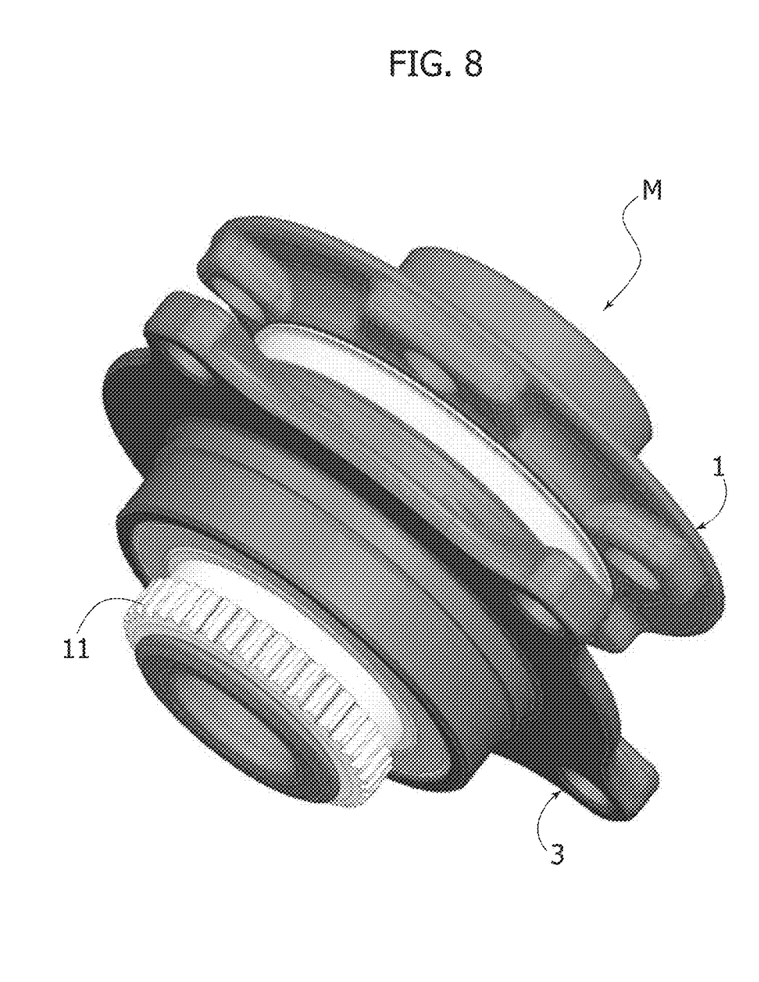
Figure 9:
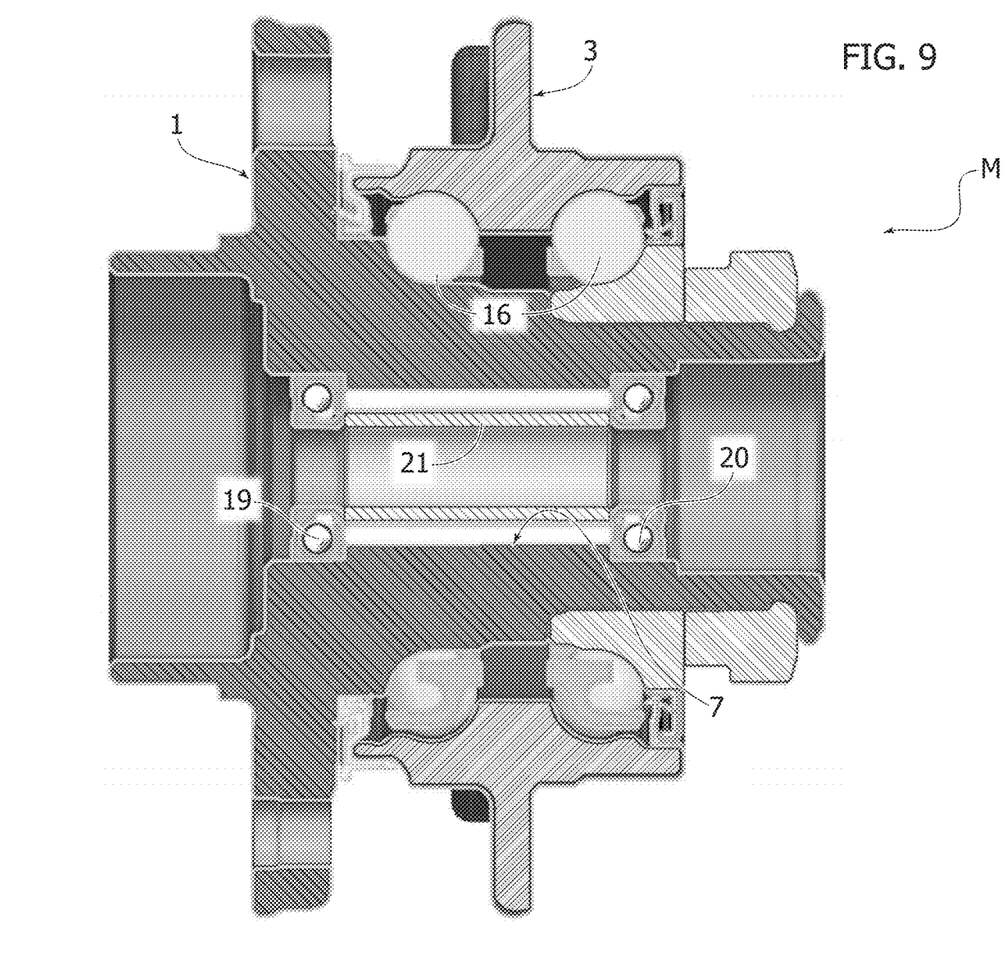
FIG. 9 is a cross-sectional view of the hub unit of FIGS. 7 and 8.

The spacer sleeve 21 is rigidly connected, for example by means of a crimping operation, to the inner rings 19B, 20B of the two bearings 19, 20, respectively. Consequently, the wheel-hub unit, designated as a whole in FIG. 9 by the reference M, which includes the hub-supporting member 3, the body of the hub 1 rotatably mounted within the hub-supporting member 3 by means of the bearing including the double ring of balls 16, the two rolling bearings 19, 20, with their outer rings mounted by interference fit within the cylindrical wall 7, the inner rings and the corresponding balls, as well as with the spacer sleeve 21 rigidly connected to the inner rings of the bearings 19, 20, can be pre-assembled off line and be mounted in a single operation on the wheel pin 5 in the production plant. During the above mounting step, the two bearings 19, 20 with the spacer sleeve 21 are fitted on the wheel pin 5 until the rolling bearing 19 that is further away from the free end of the wheel pin 5 is brought up against an annular shoulder 5A (FIG. 6) defined by a portion of enlarged diameter of the pin 5 (FIG. 6). FIGS. 7 and 8 show two perspective views of the hub unit M of FIG. 9, before it is mounted on the wheel pin.

With reference once again to FIG. 6, once the hub unit M has been mounted on the wheel pin 5, it is axially fastened by screwing of a nut 22 on a threaded portion 5B of the wheel pin 5. Tightening of the nut 22 leads the ensemble constituted by the inner rings 19B, 20B of the two bearings 19, 20, with the spacer sleeve 21, to be pressed axially against the annular shoulder 5A of the driven member 6.

Consequently, the final operation of mounting of the hub unit can be carried out in a fast and efficient way, with the assurance of obtaining proper operation of the wheel unit, without any need for complex operations of adjustment.

A further important characteristic of the invention lies in the fact that rigidly mounted on the body of the hub 1 is a cover 23, which has the purpose of protecting and isolating from the outside the central opening of the hub 1, where the bearings 19 and 20 are mounted, thus preventing any infiltration of water, mud, or dirt. Preferably, the cover 23 is made of metal material so as to perform also a function of protection against impact.

In the example illustrated (see FIG. 5), the body of the hub 1 includes a cylindrical wall 1B projecting axially from the end surface of the hub 1 onto which the cylindrical wall 7 gives out. Once again in this example, the cover 23 is in the form of a dome-shaped element made of sheet metal, with a circumferential wall 23A that is mounted by interference fit within the cylindrical wall 1B. Of course, any other configuration of the cover 23 is possible, just as any technique may be employed for rigidly connecting the cover 23 to the body of the hub 1 in a removable way.

Of course, without prejudice to the principle of the invention, the details of construction and the embodiments may vary widely with respect to what has been described and illustrated herein purely by way of example, without thereby departing from the scope of the present invention, as defined in the annexed claims.

What is claimed is:

1. A wheel unit with a disengageable drive for an electric vehicle, comprising:
    a wheel support,
    a wheel hub rotatably supported by the wheel support,
    a wheel pin rotatably mounted, by means of two rolling bearings axially spaced apart from each other, within a cylindrical wall of a central opening of the wheel hub,
    wherein the wheel pin is carried by a rotatable member configured to be driven by an electric motor of the electric vehicle, and
    a coupling device for releasably connecting said driven rotatable member to the wheel hub,
    the wheel pin is rotatably mounted within the cylindrical wall of the wheel hub by means of the two rolling bearings that are axially spaced apart from each other and have respective outer rings mounted by interference fit within said cylindrical wall, against two respective annular shoulders of said cylindrical wall that face two opposite ends of the cylindrical wall,
    said rolling bearings having respective inner rings rigidly mounted on said wheel pin and rigidly connected together by means of a spacer sleeve having a length predetermined as a function of an axial distance between said annular shoulders, and
    the wheel unit consisting of said wheel hub with said rolling bearings and said spacer sleeve being assemblable before being mounted on said wheel pin.

2. The wheel unit according to claim 1, wherein;
    said two rolling bearings are ball bearings,
    wherein a first ball bearing of said ball bearings; which is further away from a free end of the wheel pin has its inner ring resting against an annular shoulder of said driven rotatable member, and
    wherein a second ball bearing of said ball bearings has its inner ring that is axially fastened by a nut screwed on a threaded portion of a free end of said wheel pin so as to press axially an ensemble of the two inner rings of said ball bearings; with the spacer sleeve interposed therebetween, against said annular shoulder of the driven rotatable member.

3. The wheel unit according to claim 1, wherein an end of the cylindrical wall of the central opening of the wheel hub that faces outwards is protected and isolated from the atmosphere by a covering element rigidly connected to the wheel hub.

4. A wheel-hub unit, for a wheel unit with a disengageable drive for an electric vehicle, comprising:
    a hub-supporting member configured to be rigidly connected on a wheel support,
    a wheel hub rotatably supported by said hub-supporting member, and having a central opening with a cylindrical wall which is configured to receive and rotatably support a wheel pin carried by a driven member,
    two rolling bearings axially spaced apart from each other are assembled within the cylindrical wall of the central opening of the wheel hub,
    the two rolling bearings have respective outer rings mounted by interference fit within said cylindrical wall against two respective annular shoulders of said cylindrical wall that face two opposite ends of the cylindrical wall,
    said rolling bearings have respective inner rings rigidly connected together by means of a spacer sleeve having a length that is predetermined as a function of an axial distance between said annular shoulders, and
    said wheel-hub unit, with said rolling bearings and said spacer sleeve, being configured to be assemblable on said wheel pin.

5. The wheel-hub unit according to claim 4, wherein an end of the cylindrical wall of the central opening of the wheel hub that faces outwards is protected and isolated from the atmosphere by a covering element rigidly mounted on the wheel hub.

6. A method for mounting the wheel-hub unit according to claim 4 on the wheel pin, comprising:
    in a first step said wheel-hub unit is assembled, with the inclusion therein of said roping bearings and said spacer sleeve, and
    in a second step said wheel-hub unit that has been assembled in the first step is mounted on the wheel pin, axially fastening the wheel hub unit in a mounted position by means of a nut screwed on a threaded end of the wheel pin, so as to press axially an ensemble of the two inner rings of said rolling bearings, with the spacer sleeve interposed therebetween, against a shoulder of said driven member.

* * * * *